Patented Oct. 16, 1934

1,977,545

UNITED STATES PATENT OFFICE 1,977,545

ANTIFREEZING AGENT

Eberhard Elbel, Dusseldorf, Germany, assignor to Henkel & Cie., Gesellschaft mit beschrankter Haftung, Dusseldorf, Germany No Drawing. Application March 14, 1933, Serial No. 660,773. In Germany March 26, 1932

6 Claims. (Cl. 252—5)

It has been found that the lower mono-alkyl ethers of glycerol are excellent for use as anti-freezing agents, for example, in motor vehicle radiators, hot water heating systems, gas meters, fire-extinguishing appliances and the like. Among such ethers may be mentioned by way of example the monomethyl ether, the mono-ethyl ether and the mono-isopropyl ether of glycerol.

By adding these substances to water, solutions are obtained which are remarkable for their excellent frost-resisting properties. At very low temperatures they form only cream-like masses which cannot burst the walls of vessels in which they are contained. Furthermore, at very low temperatures they are still very fluid and mobile and are also of low viscosity, so that their circulation in enclosed systems is not impaired.

They are poor solvents and may therefore be advantageously employed wherever the cooling liquids come into contact with rubber and the like.

The said compounds may be employed either alone or in admixture with water or other additions, known per se, such as salts and the like.

The employment of alkyl ethers of the glycols and higher glycols as anti-freezing agents is known. The anti-freezing agents of the present invention differ from these known agents in that, first they possess a lower solvent power, and second, that they have a considerably higher boiling point. The lower solvent power results in the advantage that, when the new antifreezing agents are employed, there is no danger of damaging paintwork, for example the paintwork of motor vehicle bodies. The higher boiling point results in the advantage that the new antifreezing agents do not volatilize readily, so that they require renewal less frequently.

Example 40 per cent. by weight of glycerol monomethyl ether is added to the cooling water for motor vehicle engines. The solution remains very fluid and free from deposits down to a temperature of —15° C.

I claim:—

1. A refrigerating liquid composition comprising water and a lower mono-alkyl ether of glycerol.

2. A refrigerating liquid composition comprising water, a lower mono-alkyl ether of glycerol and a salt.

3. A refrigerating liquid composition comprising water and the mono-methyl ether of glycerol.

4. A refrigerating liquid composition comprising water and the mono-ethyl ether of glycerol.

5. A refrigerating liquid composition comprising water and the mono-isopropyl ether of glycerol.

6. A refrigerating liquid composition consisting of a 40% aqueous solution of glycerol monomethyl ether.

EBERHARD ELBEL.